United States Patent

[11] 3,577,644

| | | |
|---|---|---|
| [72] | Inventors | Edward Ratcliffe;<br>William N. Crawford, Mont. St. Hilaire, Quebec, Canada |
| [21] | Appl. No. | 747,937 |
| [22] | Filed | July 26, 1968 |
| [45] | Patented | May 4, 1971 |
| [73] | Assignee | AMSTED Industries Incorporated<br>Chicago, Ill. |

[54] WHEEL TREAD CONTOUR APPARATUS
9 Claims, 10 Drawing Figs.
[52] U.S. Cl. .................................................. 33/203.11,
33/23
[51] Int. Cl. ................................................... B61k 9/12
[50] Field of Search .......................................... 33/203.11,
203.16, 203.19, 42, 41 (E), 143 (D), 23 (C)

[56] References Cited
UNITED STATES PATENTS

| | | | |
|---|---|---|---|
| 2,589,923 | 3/1952 | Braund .......................... | 33/23(C) |
| 848,846 | 4/1907 | Patterson ...................... | 33/203.11 |
| 878,499 | 2/1908 | Browning, Jr. ................ | 33/203.11 |
| 878,500 | 2/1908 | Browning, Jr. ................ | 33/203.11 |
| 1,510,819 | 10/1924 | Barth ............................ | 33/203.11X |

*Primary Examiner*—William D. Martin, Jr.
*Attorney*—Walter L. Schlegel, Jr.

ABSTRACT: A testing apparatus has indicators to measure the elevational distance between points on the periphery of wheels having treads and flanges and means to trace and reproduce peripheral section contours of said wheels. The measurements and reproductions may be used to determine wheel wear and high wear areas of the wheels.

INVENTORS
EDWARD RATCLIFFE
WILLIAM N. CRAWFORD
BY Walter L. Schlegel, Jr.
ATT'Y

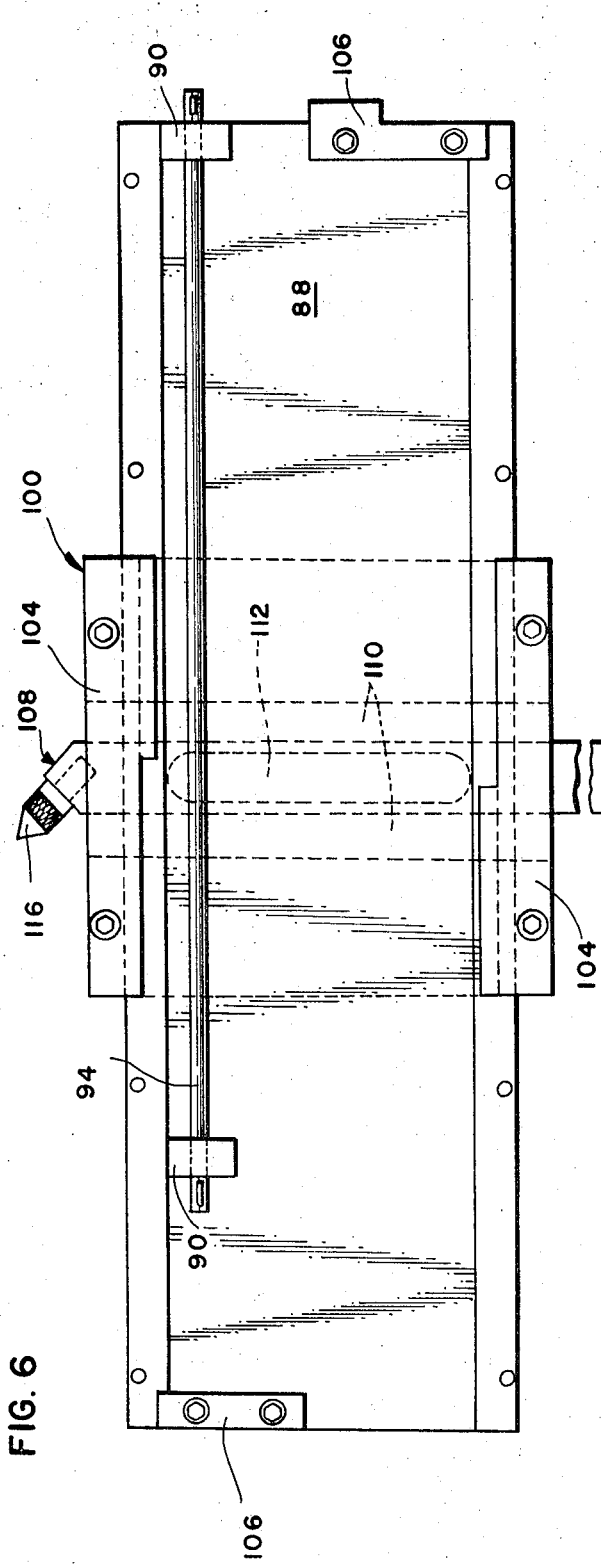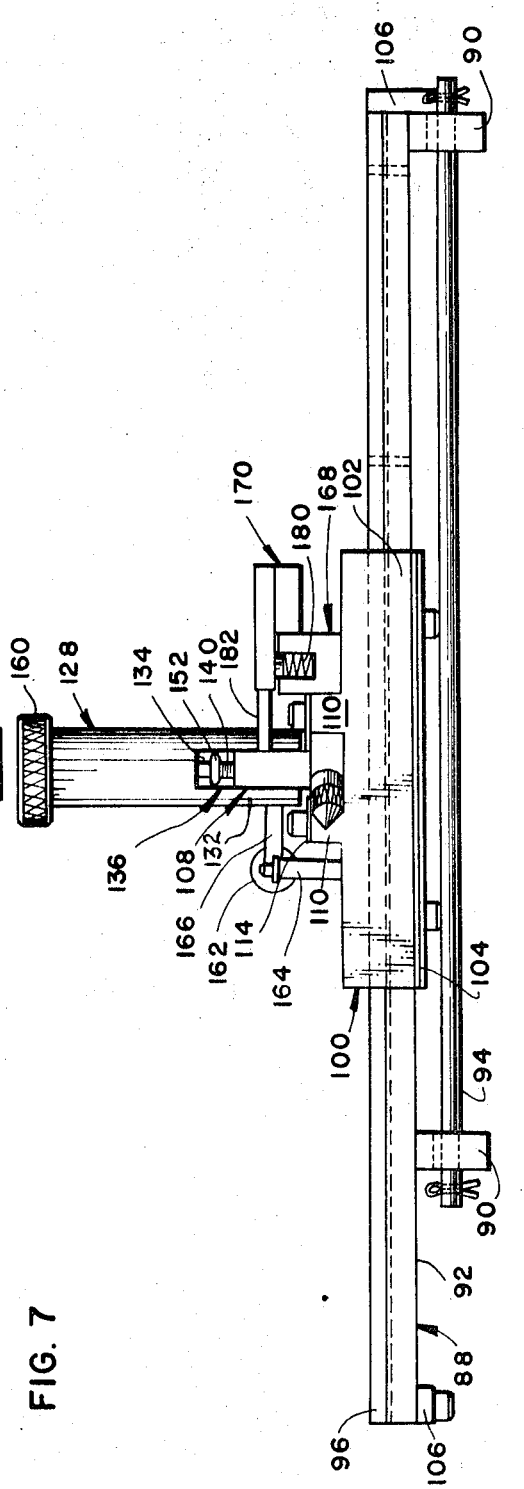

PATENTED MAY 4 1971

INVENTORS
EDWARD RATCLIFFE
WILLIAM N. CRAWFORD
BY *Walter L. Schlegel, Jr.*
ATT'Y

WHEEL TREAD CONTOUR APPARATUS

This invention relates to a testing apparatus and more particularly to an apparatus that may be used in taking elevation measurements on the periphery of wheels having treads and flanges and in reproducing peripheral section contours of said wheels.

The development and production of quality railway car wheels requires the testing, inspecting and comparing of various designs and materials over thousands of miles of actual railway use in order to arrive at the ideal combination of factors. These testing programs require a variety of data, among which is the amount of wear that has occurred on the tread of a wheel relative to the flange and the location of this wear. In a nondestructive testing program, it is desirable to take data to determine these factors as quickly and accurately as possible. This data should also be easily evaluated to determine the results of the test. It is, therefore, an object of this invention to provide a testing apparatus that may be used to take data for determining the progressive wear of the treads of wheels relative to the flanges.

Another object of this invention is to provide an apparatus that will rapidly reproduce peripheral section contours of wheels having treads and flanges.

A further object of this invention is to provide an apparatus that may be used to simultaneously reproduce peripheral section contours of a pair of wheels and provide readings that are usable to determine the wear of the wheels.

Still another object of this invention is to provide an apparatus that may be easily aligned with wheels in obtaining test data usable to determine wheel wear.

Another object of this invention is to provide an apparatus that may be used to take data to determine the wear of railway car wheels.

The various objects and features of this invention will be fully understood from the following description of a typical preferred form and application of the invention, throughout which description reference is made to the accompanying drawings.

FIG. 6 is a bottom plan view of a guide assembly desk embodying features of this invention;

FIG. 7 is a side elevation of a guide assembly desk and follower mechanism;

Figure 1:
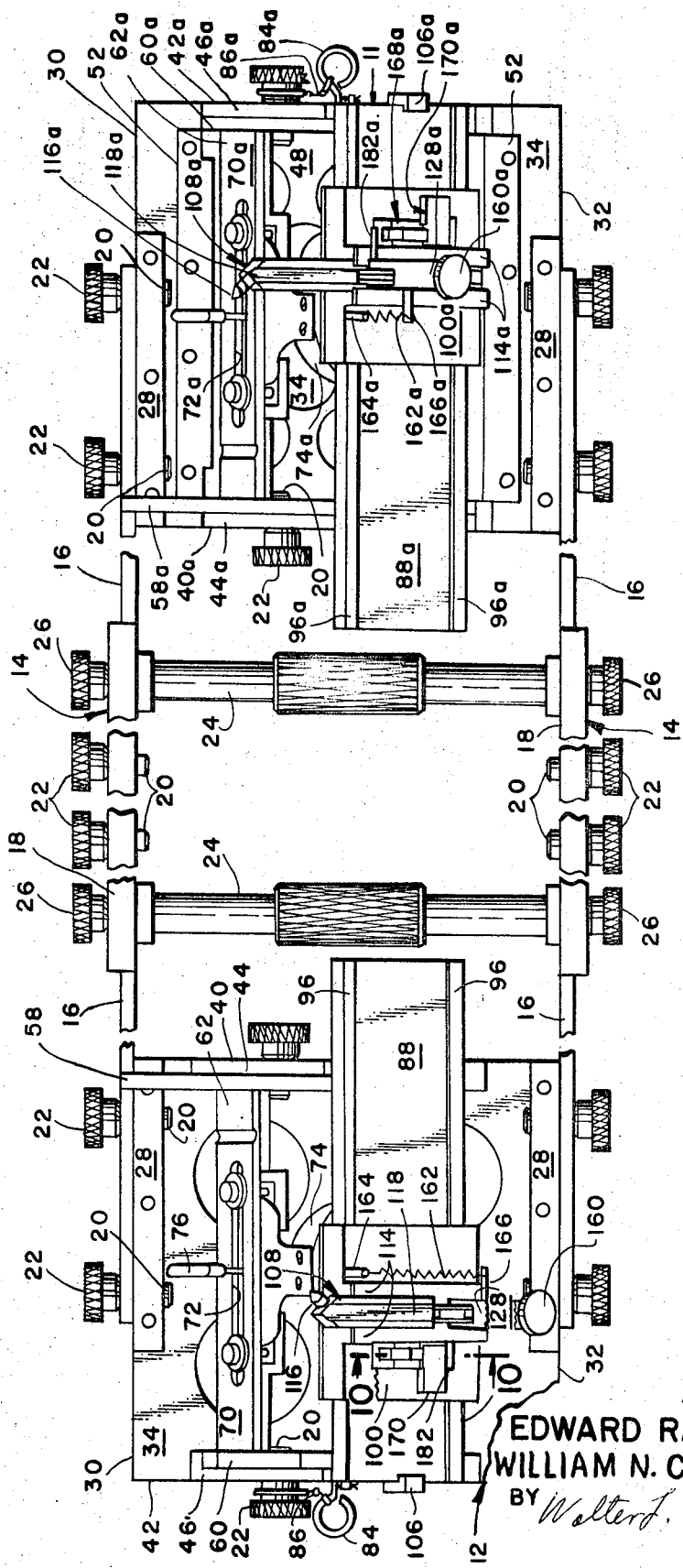
FIG. 1 is a top plan view of a wheel tread contour apparatus illustrating a movable and a stationary guide assemble and embodies features of this invention.
Figure 5:
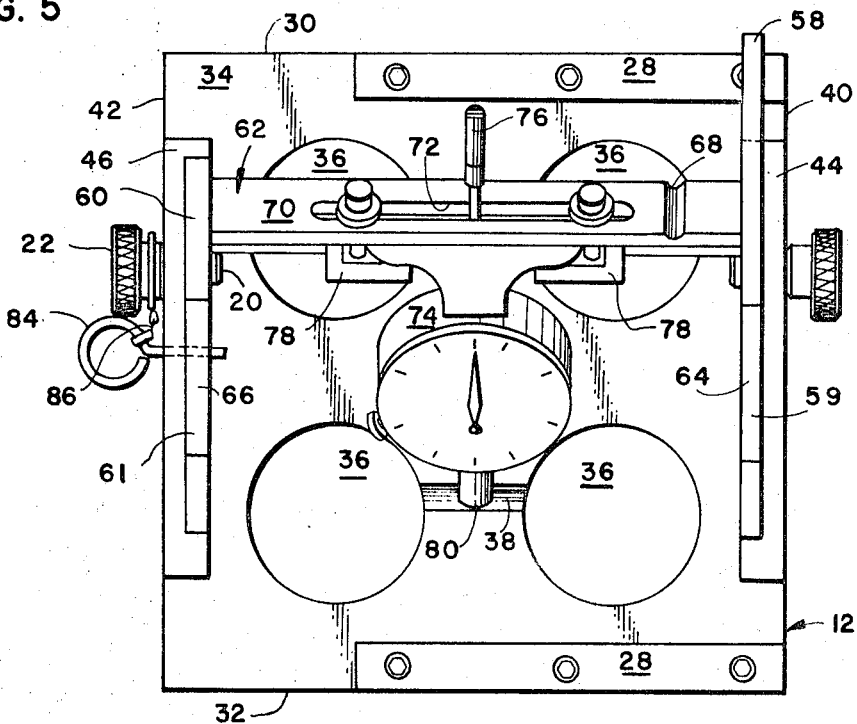
FIG. 5 is a top plan view of a stationary guide assembly base illustrating a measuring indicator and embodies features of this invention.

Referring now to the drawings, FIG. 1 illustrates a wheel tread contour apparatus comprising a movable and a stationary guide assembly, respectively shown at 11 and 12, interconnected by opposed adjustable parallel support members 14. Each support member 14 has beams 16 detachably retained within channel strips 18 by bolts 20 and knobs 22. Spaced tie bars 24, interconnect the support members 14 and are detachably secured thereto by knob headed bolts 26. Bolts 20 and knobs 22 detachably secure the support members 14 proximate their ends to base bars 28 mounted on the front and rear edges 30 and 32 of the opposing baseplates 34 of the guide assemblies 11 and 12. As shown in FIG. 5, each baseplate 34 has lightener holes 36. A dial gauge clearance trough 38 interconnects two of these holes and is parallel to the support members 14 when the baseplate 34 is in assembly.

Although other means of fastening the various parts may be used, knobs 22 and knob headed bolts 26 are shown in various places in the wheel tread contour apparatus due to the ease they offer in assembling and disassembling the various sections.

As illustrated in FIG. 1, the left-hand guide assembly 12 is stationary relative to the support members 14, while the right-hand guide assembly 11 has limited movement parallel to the support members 14. Since the bases of the two guide assemblies 11 and 12 are constructed differently to accommodate for the stationary and movable factors, each guide assembly base will be discussed separately.

Figure 3:
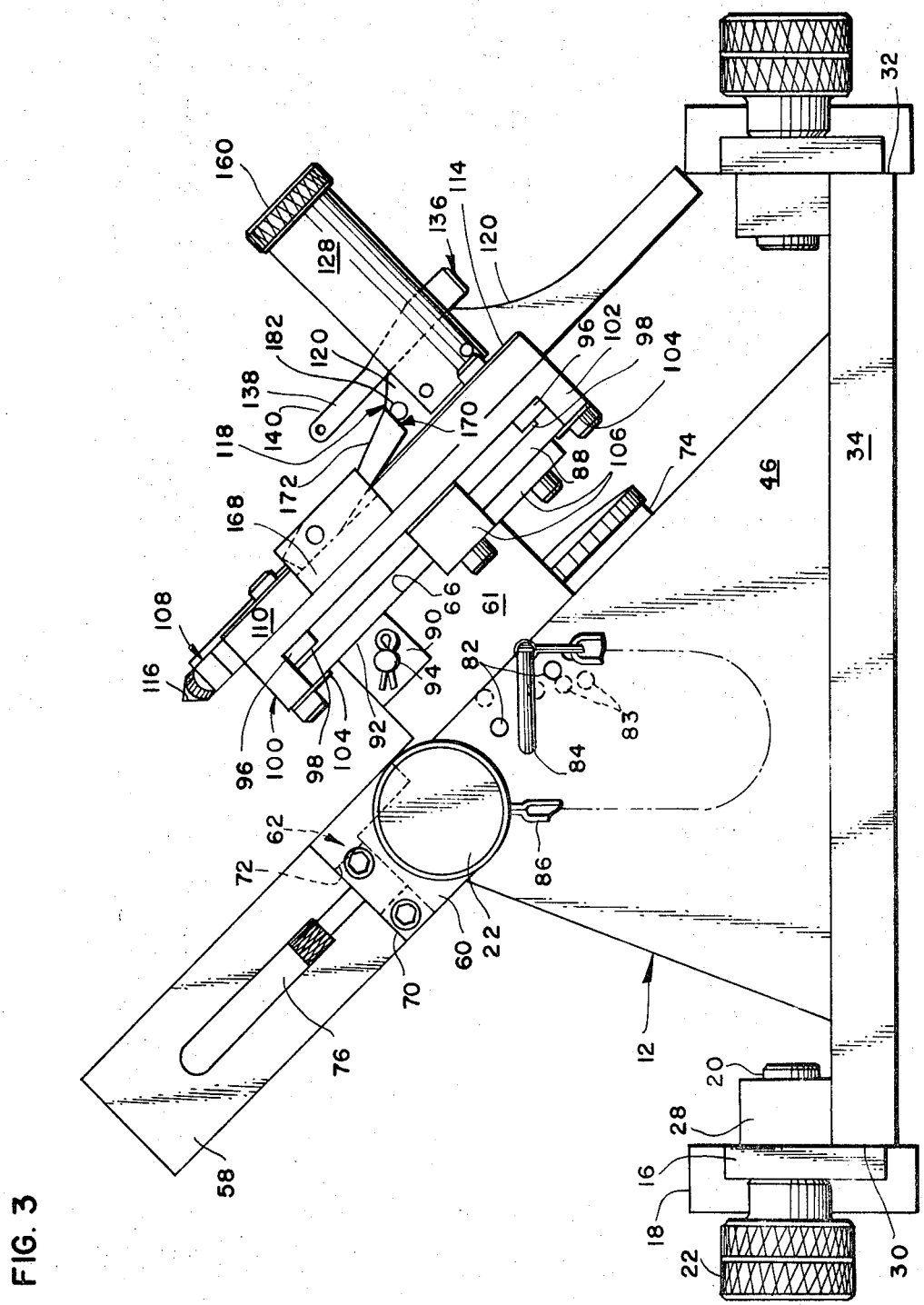
FIG 3 is a side elevation of a stationary guide assembly.

Proximate the inside and outside edges 40 and 42 of the baseplate 34 located on the stationary guide assembly 12, as shown in FIGS. 1, 3 and 5, and intermediate the support members 14, opposed, corresponding, parallel inside and outside triangular supports 44 and 46 extend perpendicularly upward from the baseplate 34 and are secured thereto by appropriate fasteners.

Figure 2:
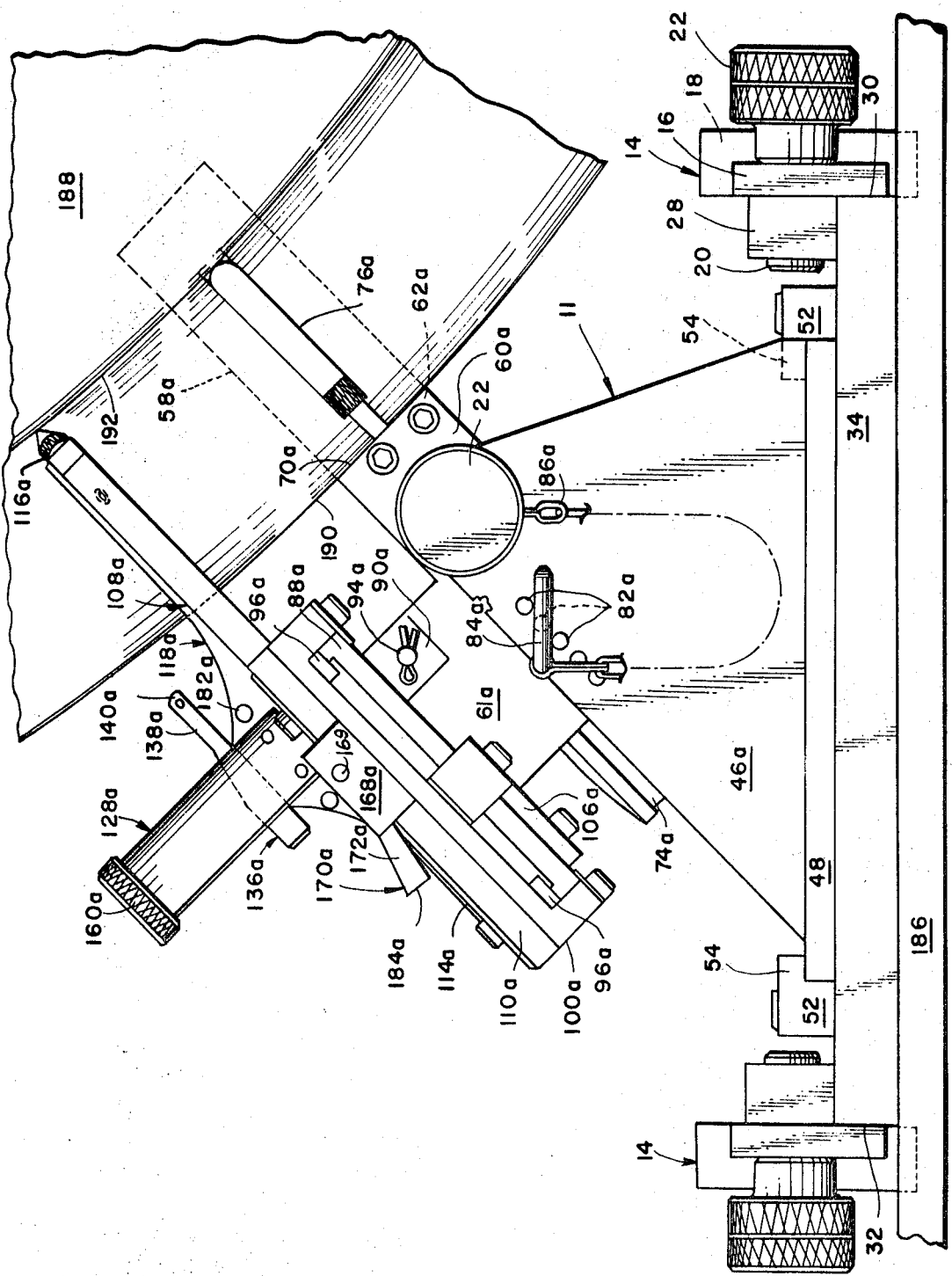
FIG. 2 is a side elevation of a movable guide assembly on a railway rail contacting a fragment of a railway car wheel.
Figure 4:
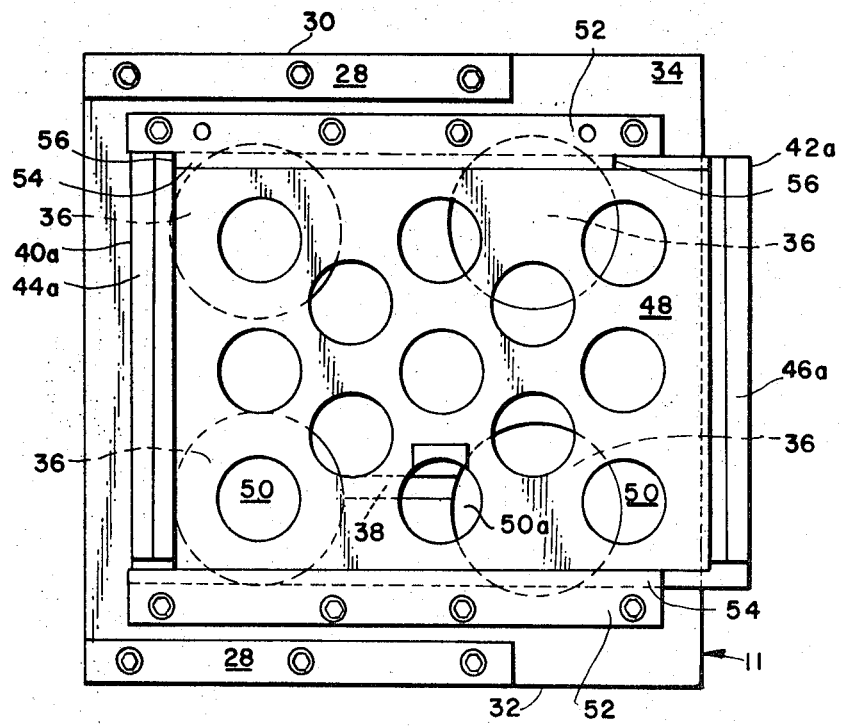
FIG. 4 is a top plan view of the slide base of a movable guide assembly.

As illustrated in FIGS. 2 and 4, the movable guide assembly 11 has a slide plate 48 above and in sliding engagement with the baseplate 34. Lightener holes 50 are shown arranged in a symmetrical pattern in the slide plate 48 whereby one hole 50a is situated intermediate the inside and outside edges 40a and 42a of the slide plate 48 exposing the dial gauge clearance trough 38 in the baseplate 34. Flanking the slide plate 48 are slide tracks 52 parallel to the support members 14 and secured to the baseplate 34 by appropriate fasteners. Each slide track 52 has a lip 54 extending over the slide plate 48 for retarding vertical movement thereof.

Inside and outside triangular supports 44a and 46a, similar to those shown on the stationary guide assembly 12, are secured proximate the inside and outside edges 40a and 42a of the slide plate 48 of the movable guide assembly 11 by fasteners, and extend perpendicularly upward therefrom. The triangular supports 44, 46, 44a and 46a in assembly, on their respective plates 34 and 48, are of equal height. The triangular supports 44a and 46a aid in limiting the horizontal movement of the slide plate 48 by contacting the lips 54 of the slide tracks 52. Recesses 56 may be provided in the lips 54 to permit greater horizontal slide plate travel.

Because the remaining parts of the two guide assemblies 11 and 12 are basically similar from the triangular supports 44, 44a, and 46a on further reference to a part on one guide assembly will be considered as a reference to a corresponding part on the other guide assembly. It should be noted that the opposed guide assemblies 11 and 12 are of the opposite hand. Items on the stationary guide assembly 12 will be referred to by numerals while the corresponding item on the movable guide assembly 11 will have the corresponding numeral followed by an *a*, e.g., see inside triangular supports 44 and 44a on guide assemblies 12 and 11 respectively. In this way, easy reference may be made back and forth between the various drawings and the similar parts without needlessly explaining the construction of identical opposite hand parts.

FIGS. 3 and 5 illustrate the stationary guide assembly 12 comprising long and short supports 58 and 60 pivotally connected by bolts 20 and knobs 22 to the inside and outside triangular supports 44 and 46. Each support 58 and 60 has an extending arm 59 and 61 projecting upwardly away from the support members 14. A horizontal angle bar 62 interconnects the opposing pivoting supports 58 and 60 and is secured thereto by appropriate fasteners. The pivoting supports 58 and 60 are so interconnected by the angle bar 62 that their respective upper edges 64 and 66 on the extending arms 59 and 61 are coplanar.

A circular groove 68 is located on the upper face 70 of the angle bar 62 proximate the long pivoting support 58. In the upper face 70 and intermediate the supports 58 and 60 is an elongated slot type opening 72.

As shown in FIG. 5, a dial gauge indicator 74, having an indicator point 76 extending through the elongated opening 72, is secured to the angle bar 62 by gauge supports 78. A foot 80, of the dial guage 74, is seated on the baseplate 34. In the movable guide assembly 11 the foot 80a of the dial gauge 74a extends through the hole 50a onto the baseplate 34. As the slide plate 48 moves along the baseplate 34 the foot 80a slides on the plate 34 proximate the trough 38 which provides clearance and prevents interference between the two members. Pivoting movement of the long and short supports 58 and 60, as best seen in FIGS. 3 and 5, results in a corresponding movement of the dial gauge indicator 74 and point 76.

As shown in FIG. 3, a row of aligned apertures 82 is located in the outside triangular support 46 opening into the short pivoting support 60. A corresponding row of apertures 83 appears in the short support 60. The angle of the coplanar edges 64 and 66 of the supports 58 and 60 may be changed relative to the support members 14 by aligning any two corresponding apertures in rows 82 and 83. A pin 84 is shown engaging two apertures, thereby retaining the coplanar edges 64 and 66 at a given angle. Interconnecting a knob 22 and the pin 84 is a loose retaining chain 86.

FIGS. 6 and 7 illustrate a rectangular desk base, shown generally at 88, having aligned projecting arms 90 located on its bottom edge 92 for slideable, abutting engagement with the outside edges of the arms 59 and 61 of the pivoting supports 58 and 60. The bottom edge 92 of the desk base 88 is seated on the coplanar edges 64 and 66 of the arms 59 and 61, as shown in FIG. 3. A holder rod 94 extends through aligned apertures in the arms 59 and 61 of the supports 58 and 60 and the projecting arms 90 of the desk base 88, thereby providing pivoting movement of the desk 88 relative to the supports 58 and 60. In assembly, the desk base 88 may be pivoted to expose the dial gauge 74 below.

Paper holding bars 96, secured to the upper surface of the desk base 88 by fasteners, form slots 98, as shown in FIG. 3, for retaining an indicator card (not shown) used for recording the reproduction of wheel tread contours and dial gauge readings. A piece of paper having the appropriate dimensions for the desk base 88 may be used as an indicator card.

A horizontal guide 100 is associated with the desk base 88 and slides on the paper holding bars 96 parallel to the support members 14. Opposed projecting sides 102 of the guide 100 extend below the desk base 88 and have stop plates 104 secured thereto by fasteners. Stop blocks 106, secured proximate either end of the desk 88, limit excessive horizontal movements of the guide 100 by contacting the stop plates 104.

A stylus slide 108 is seated on the horizontal guide 100 and is flanked by parallel ribs 110 that are perpendicular to the support members 14. Located directly below the stylus slide 108 is an elongated slot 112 in the horizontal guide 100 opening onto the desk base 88. Wear plates 114, secured to the ribs 110 of the horizontal guide 100, are in abutting engagement with the stylus slide 108 permitting the slide 108 to reciprocate. As illustrated, a contour follower 116 is mounted on a front angular edge of the stylus slide 108 and projects inwardly toward the opposing movable guide assembly 11 at an angle of approximately 45°. This follower may extend normal to the supports 14 or at a variety of given angles. The stylus slide 108 has a median vertical rib 118 projecting upwardly between the wear plates 114. Said rib 118 comprises arcuate front and back wings 120 joined at a flat plateau surface 122 that is shown parallel to the desk base 88.

A pen bore 124 in the plateau surface 122 projects through the stylus slide 108 perpendicular to the desk base 88 and opens into the elongated slot 112 of the horizontal guide 100. Secured to the bottom of the pen bore 124 is a pen guide screw 126 that is slideable within the elongated slot 112.

A pen holder 128 comprising a pen bore 130 and a bifurcated end 132 flanks the median rib 118 and is secured thereto by appropriate fasteners so that the pen bore 130 is aligned with the pen bore 124 in the median rib 118. An opening 134 is defined by the bifurcated end 132 and the flat plateau surface 122 of the rib 118.

Figure 8:
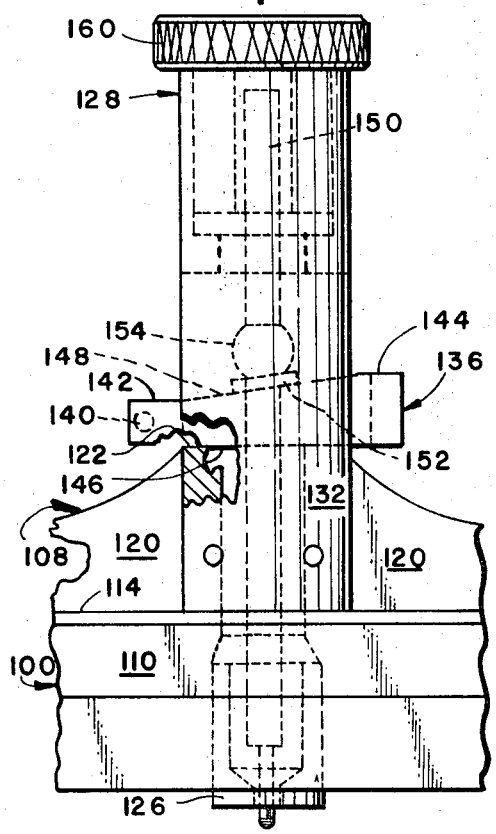
FIG. 8 is a fragmentary side elevation of a marking mechanism used to reproduce a wheel tread contour.

Associated with the opening 134 is a pen lifter 136 comprising a bifurcated end 138 enclosed by a spacer 140. The pen lifter 136 has an irregular top surface comprising flat surfaces 142 and 144 proximate either end and parallel to a bottom surface 146. Interconnecting the flat surfaces 142 and 144 is an angular surface 148 as shown in FIG. 8. In assembly, the bottom surface 146 is in slideable engagement with the flat plateau surface 122 of the rib 118.

Figure 9:
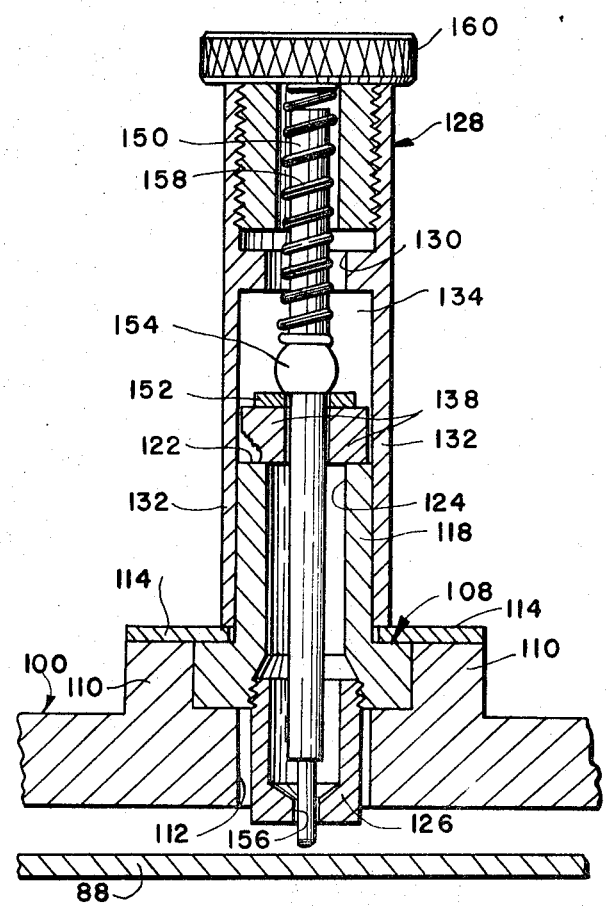
FIG. 9 is a view of FIG. 8 taken along line 9—9.

As shown in FIGS. 8 and 9, a ball point pen cartridge 150 is associated with a washer 152 retained at the pen's bulge 154. The cartridge 150 projects downwardly through the pen bore 130, the bifurcated end 138 of the pen lifter 136 where the washer 152 is retained, the pen bore 124 and an opening 156 in the pen guide screw 126. Circling the pen cartridge 150 is a compression spring 158 that is retained at one end by the pen bulge 154 and at the other end by a pen holder knob 160 detachably secured to the pen holder 128.

In an operative position, the point of the ball point pen 150 is held in contact with an indicator card on the desk base 88 by the force of the compression spring 158. The pen lifter 136 is in a back position away from the wheel permitting the washer 152 to rest on the flat surface 142. To lift the pen 150 from the card, the pen lifter 136 is pushed forward, toward the wheel 188 (FIG. 2), forcing the washer along the angular surface 148 against the force of the spring 158 until the washer 152 is seated on the upper flat surface 144. Engagement may be accomplished in a reverse manner.

An actuating means used to force the stylus slide 108 outward against a wheel, as shown in FIG. 2, is illustrated in FIG. 1 by an extension spring 162 connected at one end to a rod 164 secured to the front edge of the horizontal guide 100 and at the other end to a rod 166 secured to the median rib 118 of the stylus slide 108.

Figure 10:
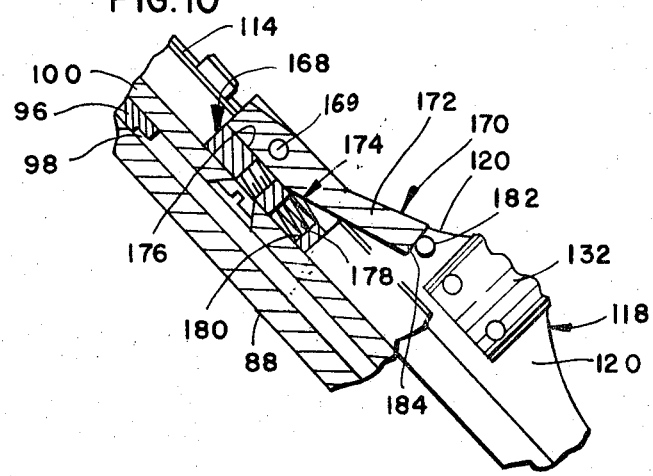
FIG. 10 is a fragmentary side elevation of a locking mechanism taken along line 10—10 of the stationary guide assembly shown in FIG. 1.

Means for retaining the stylus slide in a nonoperative position is illustrated in FIGS. 3 and 10. A grooved holder block 168 is secured to the horizontal guide 100 by a fastener. Pivotally connected in the groove (at 169) is a lock block 170 comprising a projecting arm 172 and an angular surface 174 for rocking movement on the groove seat 176 of the block 168. A compression spring 178 is located in an opening 180 in the holder block 168 and resiliently biases the arm 172 of the lock block 170 in an upwardly direction away from the horizontal guide 100. A rod 182 secured perpendicular to the median rib 118 and lying in a plane that intersects the rear surface 184 of the arm 172 retains the stylus slide 108 in s nonoperative position, as shown in FIG. 3, when it is in contact with the surface 184. The extension spring 162 pulls the stylus slide 108 forward forcing the rod 182 against the surface 184. The stylus slide 108 may be moved into an operative position, as shown in FIG. 2, by pushing the arm 172 downward toward the horizontal guide 100, thereby permitting the rod 182 to move past the lock block 170.

With a railway vehicle at rest, the wheel tread contour apparatus is placed on top of railway rails 186, as shown in FIG. 2, and moved toward a railway car wheel set comprising opposed wheels 188 (only one shown). The angle of the supports 58, 60, 58a and 60a is set relative to the support members 14 by aligning apertures in rows 82 and 82a with corresponding apertures in rows 83 and 83a with pins 84 and 84a so that the guage indicator points 76 and 76a extend toward the centers of the corresponding railway wheels 188. The angle bars 62 and 62a of the guide assemblies 11 and 12 are then moved into contact with the apices of the corresponding flanges 190. The wheel tread contour apparatus is slid sideways along the rails 186 until contact is made between the long pivoting support 58 of the stationary guide assembly 12 and the inside surface of the corresponding wheel. The movable guide assembly 11, having a horizontal slide plate 48, is then moved laterally relative to the supports 14 until the long pivoting support 58a contacts the inside surface of the other wheel. As best seen in FIGS. 1 and 2, the horizontal guide 100a of the movable guide assembly 11 is then moved toward the flange 190. The stylus slide 108a is released into an operative position by pressing arm 172a allowing the follower point 116a to contact the apex of the wheel flange 190. The pen 150a (not shown) is then moved into contacting with the indicator card on the desk base 88a by moving the pen lifter 136a backwards, away from the wheel 188.

The horizontal guide 100a is moved slowly toward the outside edge 42a of the guide assembly 11. The extension spring 162a forces the follower 116a against the wheel's flange 190 and tread 192. The corresponding lateral movement of the guide 100a and the longitudinal movement of the stylus slide 108a moves the pen 150a thereby reproducing the tread's contour on the indicator card. When the stylus follower 116a reaches the outside edge of the railway wheel 188 near the short support 60a, the pen 150a is retracted by moving the pen lifter 136a forward toward the wheel 188. The stylus slide 108a is retracted by moving the slide away from the wheel until the rod 182a locks behind the surface 184a of the arm 172a. The horizontal guide 100a is returned to the starting point and the indicator card is removed from the desk 88a.

The particular wheel and car is noted on the card for future reference. After the wheel has been used for a given period of time or miles of travel, a subsequent tread contour of the wheel may be made on the same card and compared to earlier reproductions. In this way, a constant record of the wheel's tread and flange contour may be kept over thousands of miles of railway service. The card may be so located on the desk 88, that the apex of the flange is always situated in the same place thereby permitting direct visible comparisons of the various points on the tread and flange over given periods of travel. Reproduction may be taken on the other guide assembly in a similar manner.

The desks 88 and 88a may be pivoted on the holder rods 94 and 94a to allow the faces of the dial gauge indicators 74 and 74a, one of which is shown in FIG. 5, to be visible. When the guide assemblies 11 and 12 were positioned, the indicator points 76 and 76a were retracted a given amount by the presence of the wheel's tread. The distance they were moved is indicated by the dial gauges 74 and 74a. With the angle bars 62 and 62a as reference points relative to the flanges 190, a reading may be taken on new wheels. As subsequent reproductions of the treads 192 and flanges 190 are made, new readings of the indicator gauges 74 and 74a may be taken and recorded. The location of the guide assemblies 11 and 12 relative to the wheels 188 is such that the indicator points 76 and 76a will contact a point laterally proximate that of the prior readings. By comparing these dial gauge readings, the amount of tread wear relative to the miles of travel may be determined.

It should be noted that the readings and the reproductions may be made on two wheels individually or simultaneously. The reproduction sections of the apparatus may be separated from the indicator gauges in that data from the two parts may be used separately or together.

While the invention has been illustrated in one embodiment, it is recognized that variations and changes may be made therein without departing from the invention as set forth in the claims.

We claim:

1. An apparatus for reproducing the lateral contour of the periphery of a wheel which is rotatable about an axis, the apparatus comprising a base, means connected to the base for positioning the base laterally relative to the periphery of said wheel, a pivoting support secured to the base, tracing means connected to the pivoting support for laterally following the contour of the periphery of said wheel, and marking means connected to the tracing means for movement therewith for reproducing said lateral contour.

2. The apparatus set out in claim 1, wherein the tracing means is moved in a direction parallel to the axis of rotation of the wheel, indicator means is connected to said pivoting support for measuring the elevational distance between two points on the lateral contour of the wheel, a portion of the indicator means being movable in a direction perpendicular to the axis of rotation of the wheel, and the pivoting support is in a position in which a line projecting in the direction of the movement of the movable portion of the indicator means intersects the axis of rotation of the wheel.

3. An apparatus used to take measurements of the face of a wheel comprising a base, a pivoting support secured to the base, means to position said pivoting support relative to said wheel, follower means secured to said pivoting support for tracing the contour of a peripheral section of said wheel laterally across said face, marking means connected to the follower means for reproducing said contour, and indicator means connected to said pivoting support for indicating the elevational distance between points on the face of said wheel.

4. The apparatus set out in claim 3, wherein the wheel has a tread and a flange on the face of the periphery and the indicator means indicates the elevational distance between said tread and said flange.

5. An apparatus used to take measurements of a pair of railway car wheels connected to an axle comprising a base, two pivoting supports secured to the base, lateral locating means secured to the base for locating each support laterally relative to a wheel, longitudinal locating means secured to the base for locating each support longitudinally relative to a wheel, follower means connected to each pivoting support for tracing and reproducing the contour of peripheral sections of each wheel, and indicator means connected to each pivoting support for indicating the elevational distance between points on the periphery of each wheel whereby, the apparatus is set proximate a pair of railway car wheels, each support is located laterally relative to the wheels and longitudinally relative to the wheels so that a pivoting support is proximate each wheel, the supports are pivoted to a desired angle, readings are taken on the indicator means, and the follower means are moved across the periphery of each wheel following the contour of a peripheral section of each wheel and reproducing said contour.

6. The apparatus set out in claim 5, wherein indicator means comprises reference means secured to the pivoting support and engageable with the periphery of a wheel, and lineral measuring means for determining the distance of a point on the periphery of said wheel from said reference means.

7. The apparatus set out in claim 5, wherein follower means comprises a desk base secured to a pivoting support; a horizontal guide secured to the desk base for reciprocating movement transverse to the periphery of a wheel; a stylus slide secured to the horizontal guide for reciprocating movement toward and away from the wheel; a follower point secured to the stylus slide for contacting the surface of the periphery and for moving across said surface; a recording surface secured to the desk base; and a marker secured to the stylus slide for movement therewith, said marker being engageable with said recording surface for reproducing the movement of said slide.

8. The apparatus set out in claim 7, including means connected to the horizontal guides for biasing said stylus slides toward said wheels to engage the follower points with the peripheral surfaces of said wheels.

9. The apparatus set out in claim 8, including means connected to the horizontal guides for holding said stylus slides away from said wheels and in a fixed position relative to said horizontal guides.